United States Patent [19]

Thomas

[11] 3,961,119

[45] June 1, 1976

[54] EMBOSSED PAPER TOWELING AND METHOD OF PRODUCTION

[75] Inventor: Gordon D. Thomas, Neenah, Wis.

[73] Assignee: Kimberly-Clark Corporation, Neenah, Wis.

[22] Filed: Aug. 15, 1974

[21] Appl. No.: 497,578

Related U.S. Application Data

[62] Division of Ser. No. 341,464, March 15, 1973, Pat. No. 3,868,205.

[52] U.S. Cl. .................... 428/178; 156/205; 428/184; 428/188; 428/198

[51] Int. Cl.$^2$ .................... B32B 3/12

[58] Field of Search ........... 161/127, 148, 122, 123, 161/139, DIG. 3; 156/209, 205, 290, 462, 547; 117/152; 428/178, 198, 166, 167, 188, 184

[56] References Cited

UNITED STATES PATENTS

| | | | |
|---|---|---|---|
| 2,209,311 | 7/1940 | Karcher | 156/285 |
| 3,059,313 | 10/1962 | Harmon | 161/148 |
| 3,542,634 | 11/1970 | Such et al. | 161/148 |
| 3,708,366 | 1/1973 | Donnelly | 161/127 |
| 3,720,562 | 3/1973 | Drelich | 161/148 |
| 3,738,905 | 6/1973 | Thomas | 161/127 |
| 3,765,974 | 10/1973 | Petersik | 161/148 |
| 3,765,997 | 10/1973 | Dunning | 161/148 |

*Primary Examiner*—William J. Van Balen
*Assistant Examiner*—Stanley S. Silverman
*Attorney, Agent, or Firm*—D. J. Hanlon, Jr.; W. D. Herrick; R. J. Miller

[57] ABSTRACT

Absorbent paper sheets in multi-ply web form in which the outer webs of the sheet are creped and consist of a series of ribs and grooves. The webs have their ribs secured together by adhesive dispersed in a pattern consisting of individual adhesive zones. The adhesive zones are obtained by providing in embossing apparatus cooperable rolls each having alternating ribs and grooves, the ribs of one roll being provided with protuberances and the other with recesses. The protuberances cover a relatively small area of the total rib area and carry a web on the protuberances through an adhesive applicator so that a relatively small area of the web receives adhesive for attachment to a second web.

5 Claims, 16 Drawing Figures

ADHESIVE PATTERN

ADHESIVE PATTERN

ADHESIVE PATTERN

EMBOSSED PAPER TOWELING AND METHOD OF PRODUCTION

This is a division of application Ser. No. 341,464 filed Mar. 15, 1973, now U.S. Pat. No. 3,868,205.

BACKGROUND OF THE INVENTION

This invention relates to multi-ply absorbent, soft paper products useful as towels, napkins, wipes and the like. The invention is also concerned with methods and apparatus for attaining such absorbent paper products utilizing an efficient, suitable and generally minimal amount of adhesive to secure attachment of creped tissue webs to form a multi-ply sheet product.

It is known to provide embossed webs and to laminate them into the form of a sheet by adhesive attachment on a commercial basis. This may be done by any of several methods. One common method is to apply adhesive to the embossment surfaces of one of the webs of a sheet product and uniting at the embossment surfaces of the other web. In this instance for a two-ply web, each web is separately embossed and remains in contact with their respective separate embossing rolls. Adhesive is applied in a thin layer to the embossment surfaces of one of the webs with commercially available adhesive applicating equipment and both webs are joined at their embossment surfaces in the nip formed by the mated steel embossing rolls. This method provides a high bulk product having good quality ply attachment and works satisfactorily with discrete peg types of embossing patterns. With other types of embossing patterns, particularly gross patterns consisting of continuous line or embossed line patterns, this method results in application of adhesive to the entire land area of the sheet embossments, even though adhesive attachment may be obtained at a small portion of the total embossed land area, by utilizing for embossing, roll patterns which are in crossing relationship. The result is the use of more total adhesive than necessary for ply attachment purposes, which increases the product cost and also stiffens the product structure.

The present invention is an improvement on prior art practices in that adhesive is applied in well spaced adhesive zones, and the adhesive zones define embossments which are superposed on more gross embossments of the web product. This is accomplished by securing the webs together in a combining nip formed by a pair of cooperable embossing rolls having particular characteristics. The embossing rolls for the purpose each have a series of alternating ribs and grooves disposed about its periphery; the ribs of one roll have land areas and projections extending above the land areas separated by the land areas, and the ribs of the other roll have land areas and recesses lying below and separated by these last mentioned land areas of the second roll. The projections of one roll in the rotation of the rolls is receivable in mating recesses of the other said roll. In a further embodiment each of the rolls may have projections which cooperate with the receses of the other roll.

The projections of the embossing roll support a web for the receipt of adhesive only in the zone of the projection. Since such projections may be conveniently formed by etching, grinding or the like to a very small size, the adhesive application in an adhesive zone may be quite readily limited. Such leads to good flexibility in the webs and final sheet and is conserving of adhesive.

Another advantage for the above embossing and combining method is that it results in a product having an esthetically pleasing appearance. The use of continuous line types of embossing patterns produces a product having the same appearance on both sides. With some types of line patterns, the product may lack attractiveness because of the gross nature of the embossments. By providing the continuous lines embossments of one web with spaced projections and the other with spaced recesses, a more textured or woven type appearance is obtained in the product. The laminated product still has the same general appearance on both sides. However, the embossment line recesses on one of the webs prior to lamination become slightly raised projections as received in the finished product. Similarly, the embossment line raised projections of the other web become slight recesses after lamination in the finished product. These projections and recesses being confined to the continuous line embossments area tend to break up the continuity of the embossments and result in a more pleasing pattern appearance. In fact, the product attains somewhat of a woven fabric appearance.

The invention will be more fully understood by reference to the following detailed description and accompanying drawings wherein.

Figure 1:
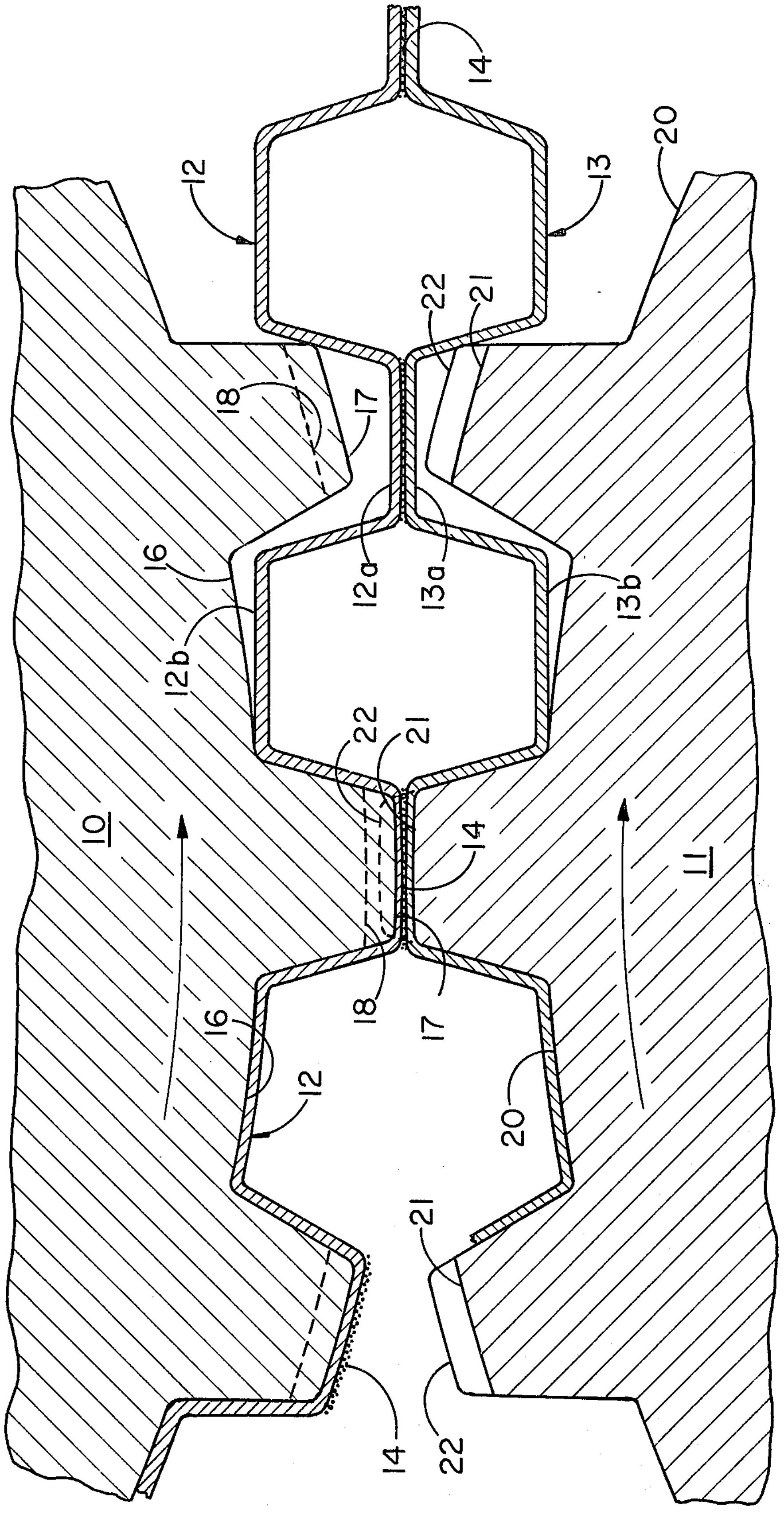
FIG. 1 is an enlarged and fragmentary view in side elevation illustrating the relationship of the combining rolls of the apparatus with the creped tissue sheets of the sheet material at the combining nip.

Referring now more in detail to the drawings, the numeral 10 (FIGS. 1–3 inclusive) designates an upper metallic combining roll which cooperates with a similar lower metallic combining roll 11. The composite sheet which issues from the nip between the combining rolls 10,11 is formed of an upper creped paper tissue web 12 and a lower creped paper tissue web 13. The upper web 12, as it approaches the nip between the combining rolls, is provided with an adhesive pattern as is most clearly indicated at 14 in FIGS. 1 and 6.

The upper combining roll 10 is provided with spirally extending ribs 15 (FIG. 2) spaced apart by grooves 16. The ribs 15 are generally rectangular in cross-section, extend at 45° to the direction of sheet travel through the rolls 10,11, and are provided over their length with a series of protuberances 17 which extend above land areas 18 separating the protuberances. The protuberances 17, as is most clearly shown in FIGS. 2 and 4, have a generally rectangular configuration as viewed in plan except at the roll ends where the protuberances terminate the roll and have a triangular configuration as indicated at 17*a*. The land areas 18 are of greater length in the embodiment illustrated than the projections 17.

Figure 5:
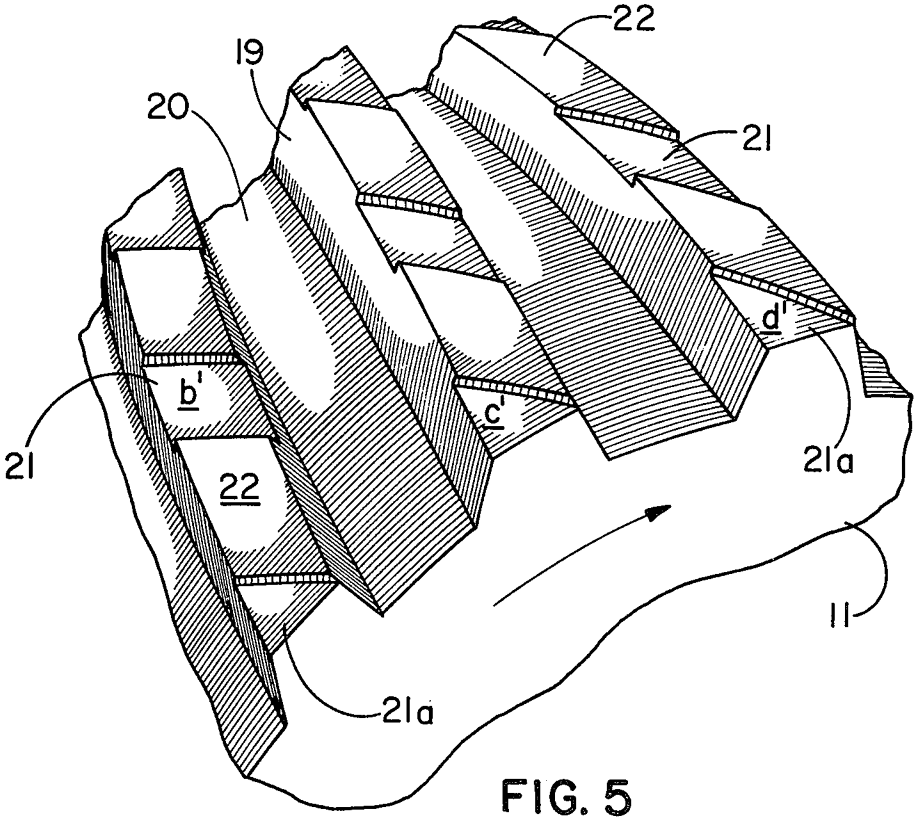

The lower combining roll 11 has ribs 19 which are generally rectangular in cross-section and separated by grooves 20 (FIG. 5). The ribs 19 over their length are provided with a series of recesses 21 also rectangular as viewed in plan spaced apart by land areas 22 of greater length than the recesses. The ribs 19 extend also at 45° to the direction of sheet travel. The roll ends, as indicated in FIG. 2, are terminated in the area of the ribs 19 by recessed portions of triangular shape 21*a*.

Figure 2:
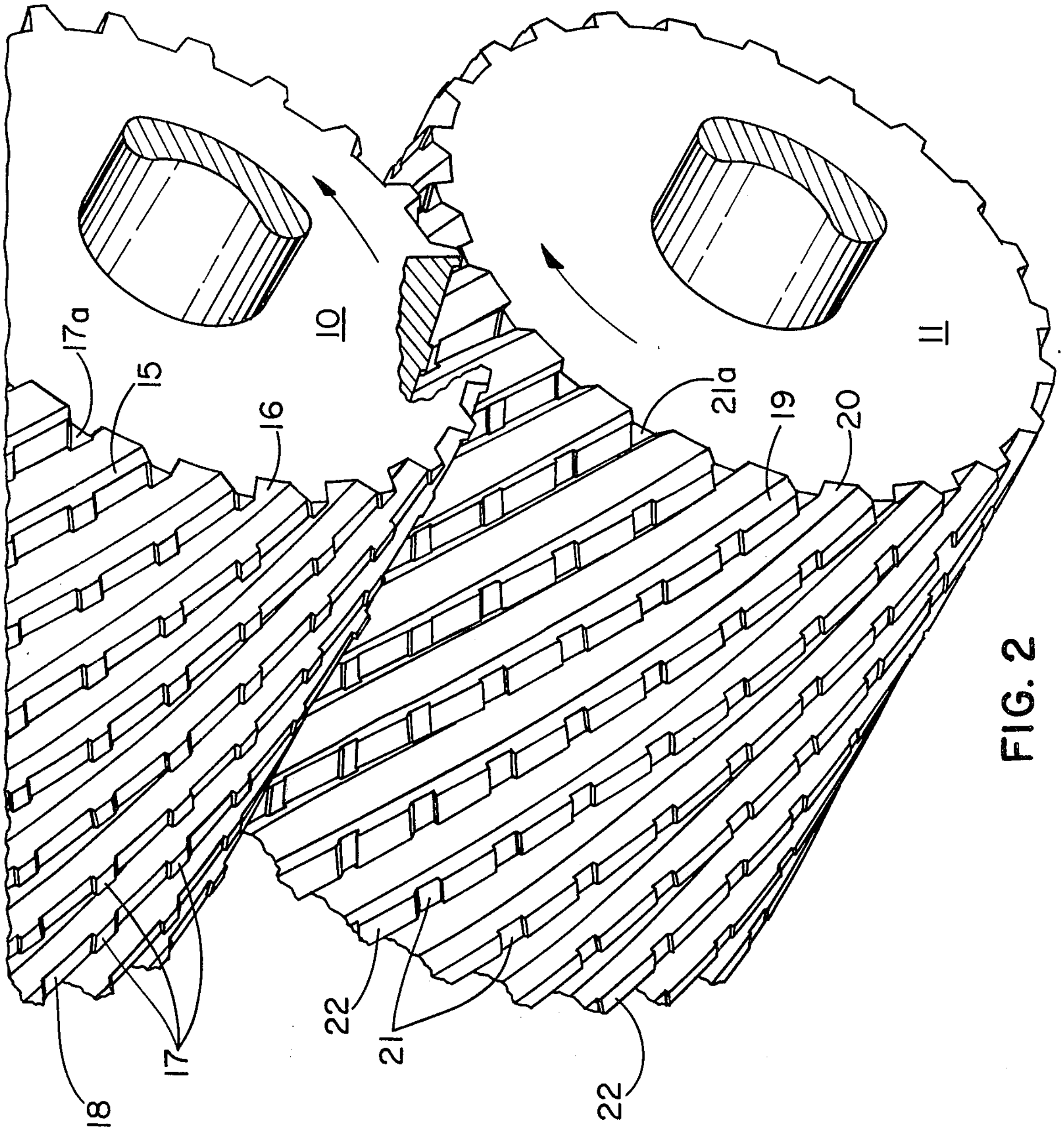
FIG. 2 is a fragmentary view in perspective of the combining rolls only illustrating the cooperative relationship of the spirally contoured rolls and their male and female segments.

The rolls 10,11 rotate in the direction indicated by the arrows (FIG. 2). The ribs 15,19 extend transversely to each other and, suitably, the ribs have a width of between about 0.015 and 0.050 inch. The grooves 16 and 20 preferably have a somewhat greater length in a direction perpendicular to adjacent ribs and are of about 0.015 to about 0.125 inch. The ribs, while generally rectangular in cross-section, suitably have slightly angled sides to facilitate web movement into the grooves.

Figure 3:
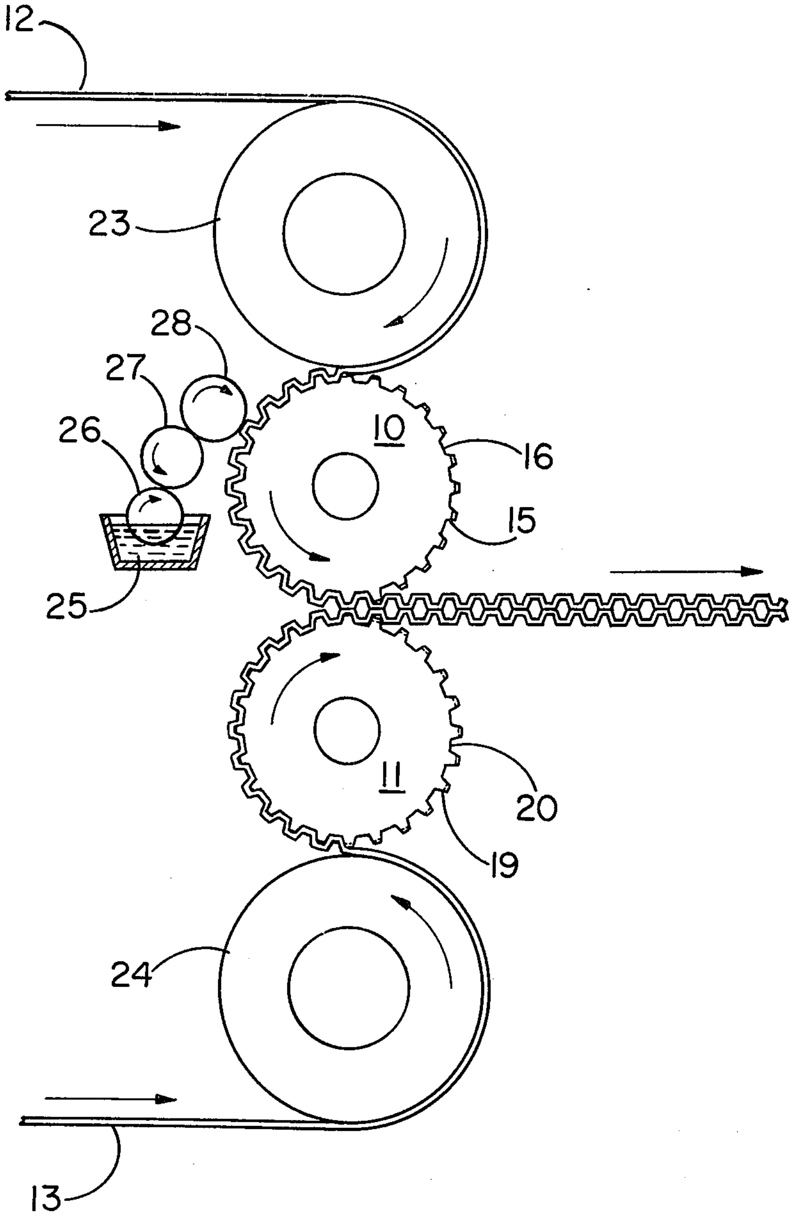
FIG. 3 is a view in side elevation of embossing apparatus useful in the production of a preferred embodiment of the sheet material and illustrating particularly a four-roll stack having rolls similar to those illustrated in FIGS. 1 and 2.
Figure 4:
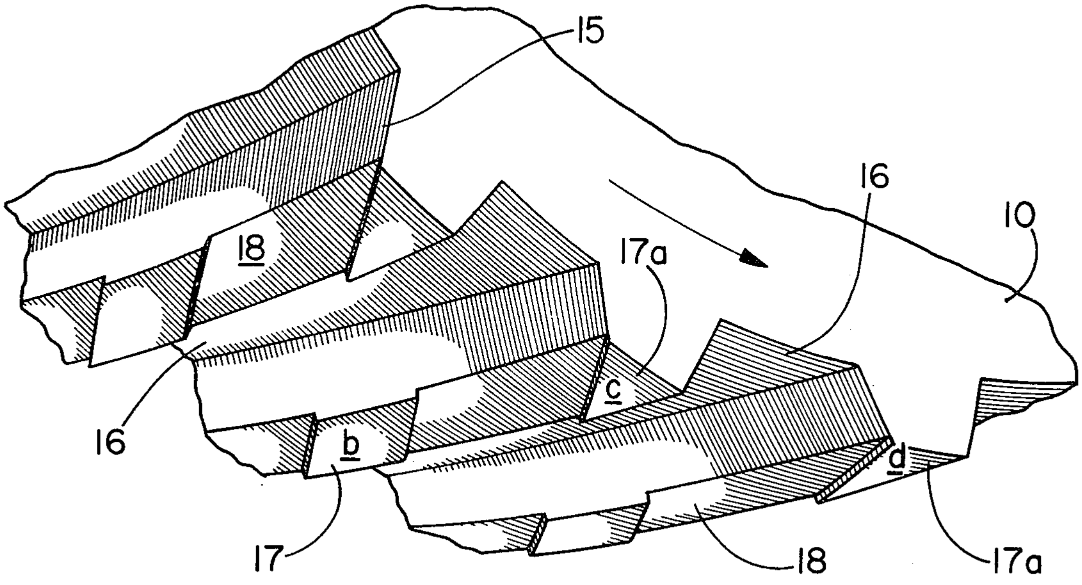
FIGS. 4 and 5 are respectively fragmentary views on a somewhat enlarged scale of the combining rolls of FIG. 3.

Referring now particularly to FIGS. 4 and 5, the projections 17 are designed in the operation of the rolls in the manner illustrated in FIG. 3 to enter into the recesses 21. The recesses are specifically made quite shallow to minimize distortion at the recess edges of webs forced into the recesses by the action of the projections 17. The projections and recesses need, for example, be only about 0.005 inch. Two plies of the web material each of thickness of about 0.001 inch are slightly compressed by the action of the combining rolls in the manner illustrated in FIG. 1 to insure of good adhesive contact of the webs 12,13.

As will be clear from a consideration of FIGS. 4 and 5, the protuberance b of roll 10, for example, mates with the recess *b* ' of roll 11; similarly, the triangular protuberance *c* cooperates with the triangular recess *c*'.

Figure 6:
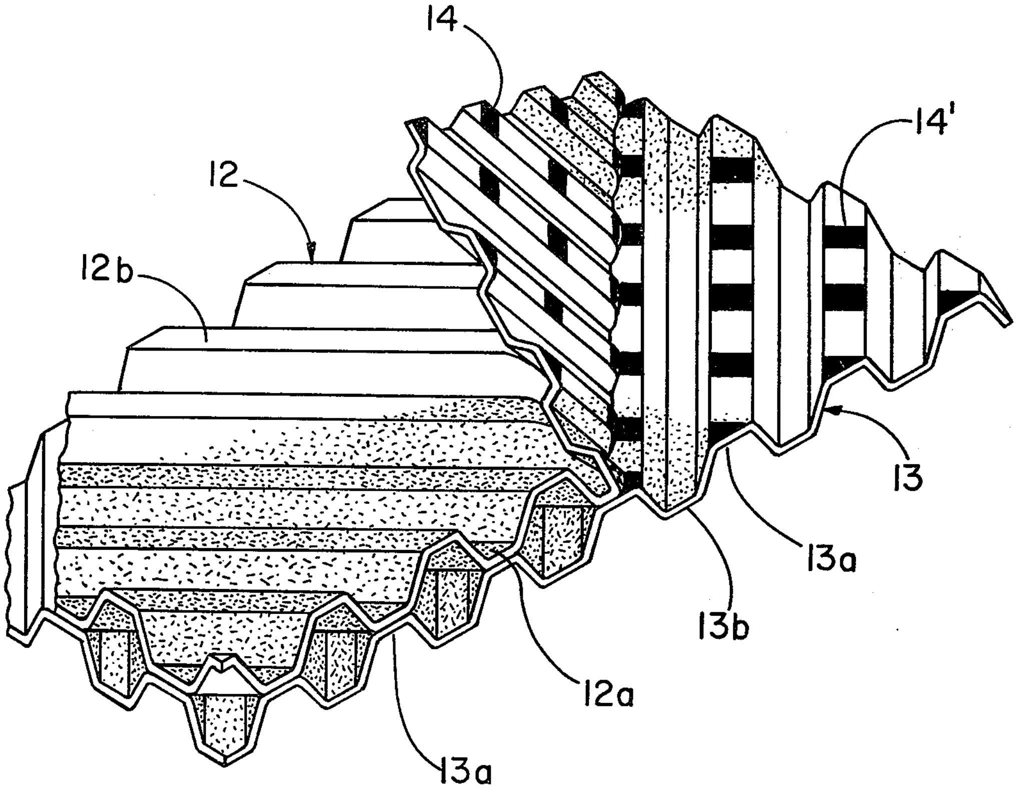
FIG. 6 is a perspective view of the sheet material with the upper web stripped back from the lower web to reveal the adhesive pattern of the sheet.

The webs 12,13 (FIG. 3) are directed to the combining rolls 10,11 respectively over rolls 23,24. In the formation of a two-ply sheet the adhesive is applied to the upper traveling web 12 as illustrated in FIG. 3. The liquid adhesive material designated at 25 is fed by a fountain roll 26 to a metering roll 27 in thin film form and transferred to roll 28. The roll 28 engages the traveling web on the combining roll 10 only at the protuberances 17,17*a* so that only a minor area of adhesive relative to the web area is added to the traveling web 12 (FIG. 6). The pattern of the adhesive in a preferred embodiment is clearly shown in FIG. 6. The lower web 13 in FIG. 6 also shows the presence of adhesive in the stripped back zone for the reason that some adhesive will adhere to the lower ply 13 when the strip back action is effected. Most importantly, however, the adhesive is only applied in well spaced areas where pressure application by the protuberances 17 on material in the recess 21 is effected and all adhesive employed serves in a bonding action.

Figure 7:
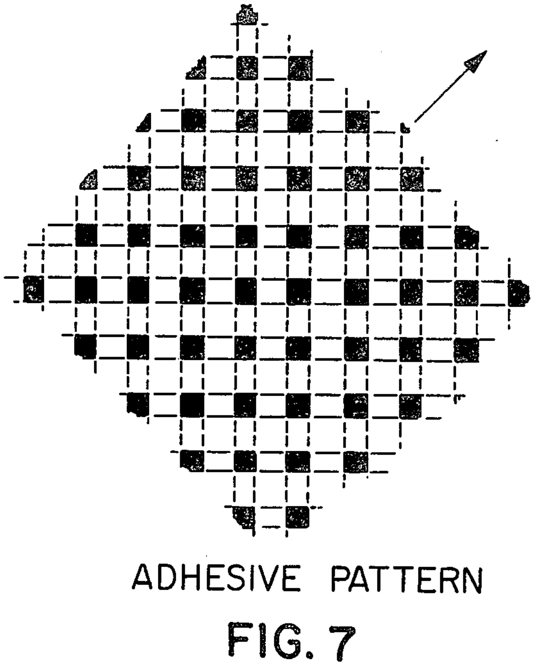
FIGS. 7 and 8 are views schematically illustrating useful adhesive patterns in the practice of the invention, the view in FIG. 7 being similar to that of the structure shown in FIG. 6.
Figure 8:
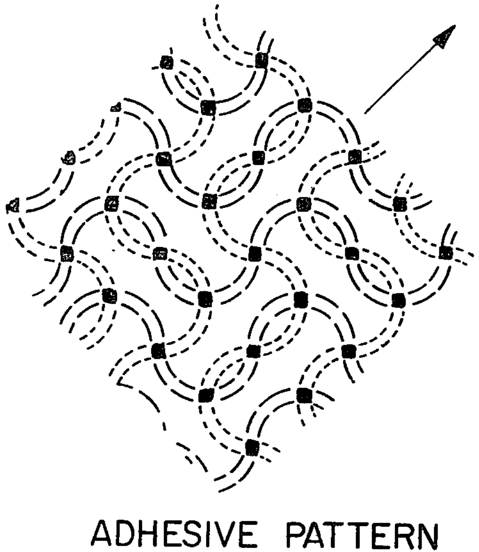

Essentially as illustrated in FIG. 7, the sheet may have an area of about 9% of the total to which adhesive has been applied. If a more flexible sheet is desired, the adhesive may be reduced and FIG. 8 illustrates a pattern which is generally sinusoidal and suitable for this latter purpose. The adhesive is shown at the cross-over points of the sinusoidal embossments of overlying webs. In the arrangement of FIG. 8 the area having adhesive is about 4% of the total area of one sheet.

Figure 9:
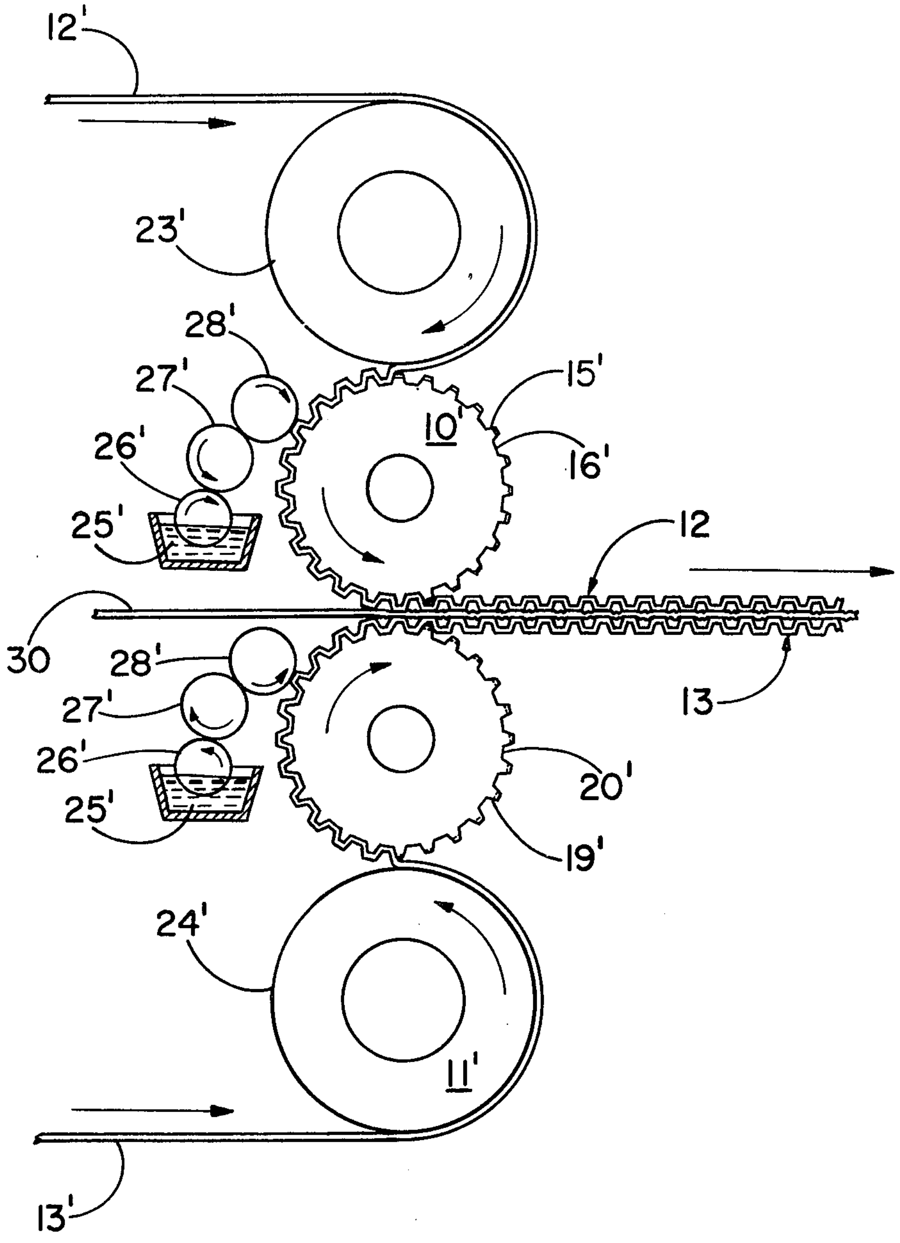
FIG. 9 is a view similar to that of FIG. 3 but illustrating a roll arrangement for the production of a three-ply sheet product.

In order to produce a three-ply product, it is desirable to apply the adhesive to each of the outer plies of the three-ply web in much the same manner as adhesive has been described as applied to the two-ply web of FIG. 6. Thus, as illustrated in FIG. 9, the creped paper web 13' which is combined at the nip between rolls 10' and 11' with the creped paper web 12' is itself adhesively treated. For this purpose a flexographic adhesive printer similar to that described in connection with FIG. 3 is provided; this mechanism includes the pond of adhesive 25', fountain roll 26', metering roll 27', and transfer roll 28'. The middle ply of the three-ply web product is indicated at 30 (FIG. 9) and receives adhesive from each of the outer plies as may be clearly seen from FIG. 12. This middle ply may be a strengthening web such as a scrim, an uncreped web or a creped web similar to the outer webs.

Figure 10:
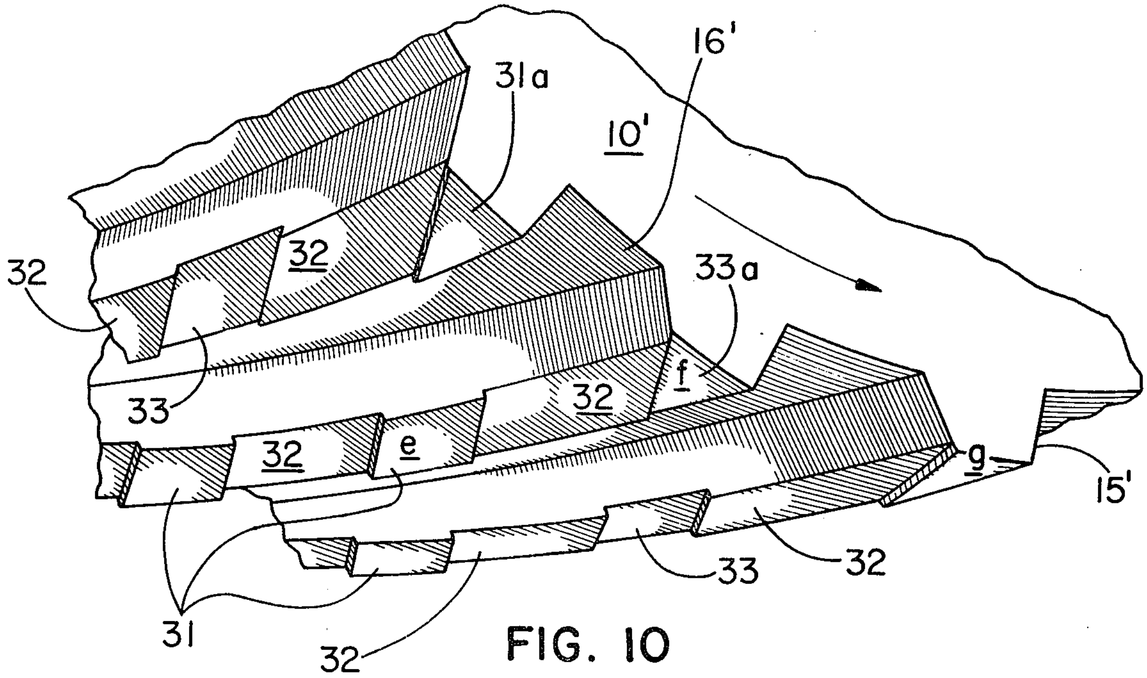
FIGS. 10 and 11 are respectively enlarged fragmentary views of the upper and lower combining rolls of the structure of FIG. 9.
Figure 11:
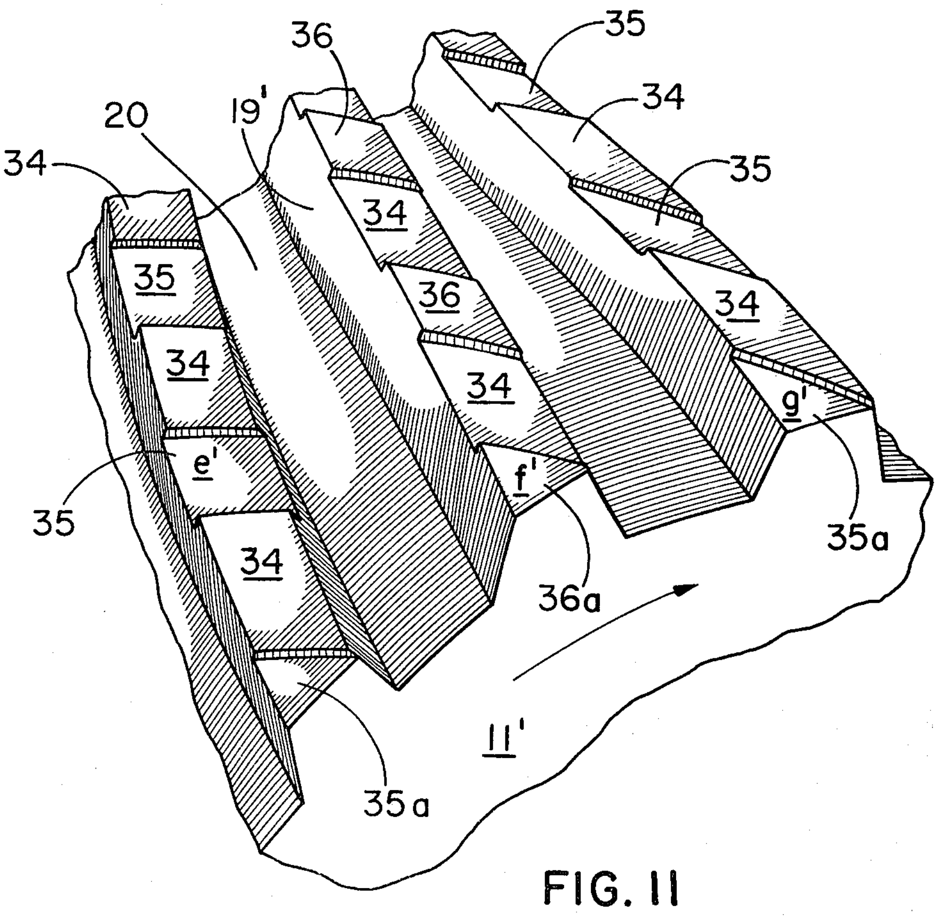
Figures 12, 13:
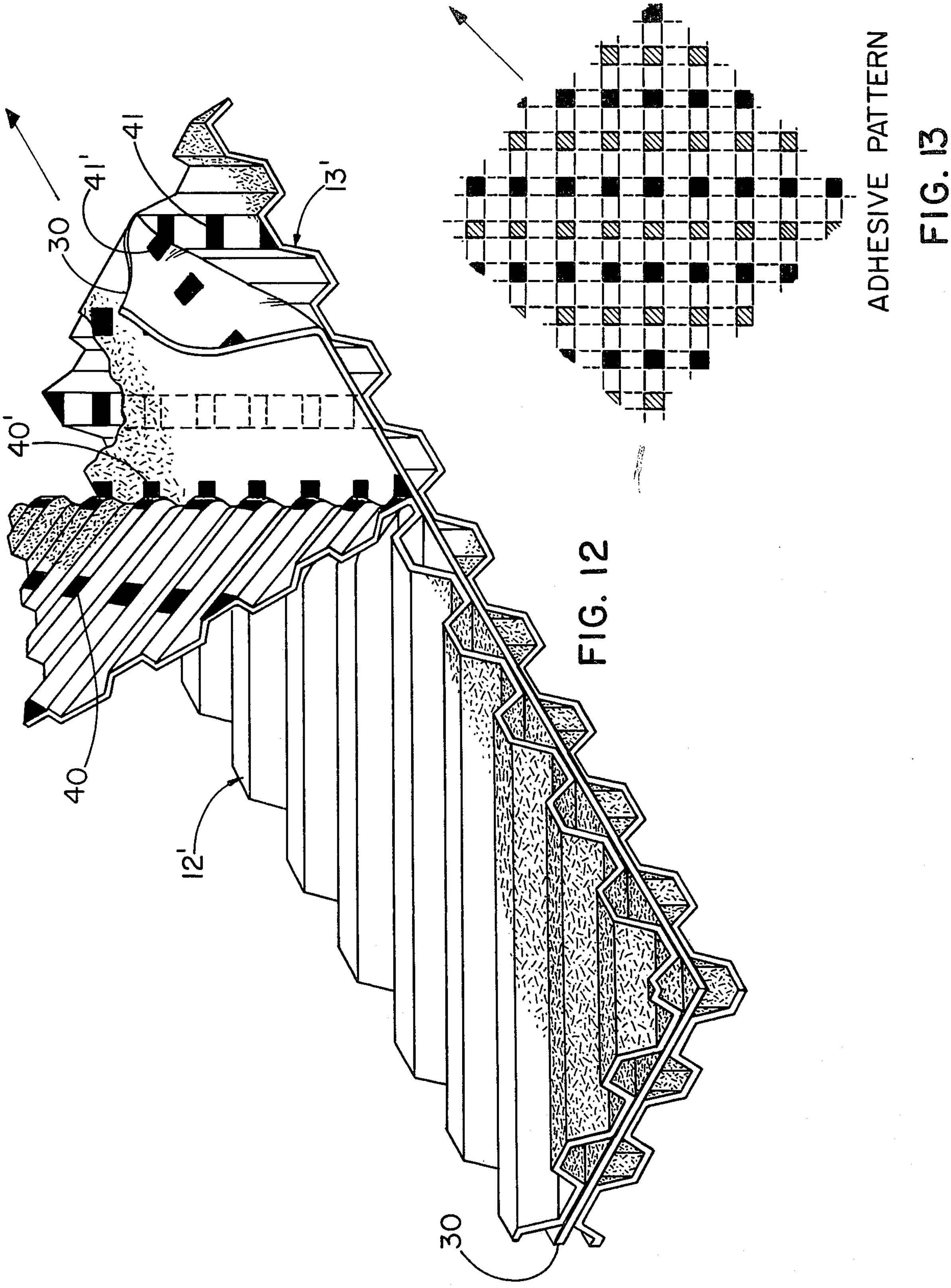
FIG. 12 is a view in perspective of a three-ply sheet (with the arrow indicating the direction of travel to the product through the combining rolls of FIG. 9) having the upper and central plies partially turned back to reveal the adhesive patterns.
FIG. 13 is a schematic view in plan illustrating more specifically the adhesive patterns of the structure of FIG. 12.

The adhesive pattern of the structure of FIG. 12 is, however, quite different than that previously mentioned in connection with FIGS. 6 through 8. The different adhesive pattern is obtained by the provision of engraved rolls such as indicated in FIGS. 10 and 11. The roll 10' has a series of spirally extending lands and grooves and the lands are configurated as follows. The land portion designated by each numeral 31 provides projections similar to those mentioned in connection with roll 10. An end projection of triangular form is shown at 31*a*. Each projection 31 lies adjacent a planar portion 32 of the land and a recess 33 of a land also lies adjacent each land portion 32. In the upper roll 10', then, each land has three levels. Thus, each projection 31 of a land is bounded by a planar portion of the land and each recess is also bounded by a planar portion of a land except at roll ends; the projection and recesses at the roll ends alternate around the roll periphery.

The lower roll 11' (FIG. 11) is provided with lands which have either recesses or projections. The numeral 34 designates the land areas of each rib. The recesses from the level 34 are designated at 35 and 35*a* while projections from level 34 are indicated at 36 and 36*a*. As is clearly seen from the drawings, the projections of roll 10' cooperate with the recesses of roll 11' in a manner similar to that described in connection with FIGS. 4 and 5. The recess at *f*, for example, cooperates with the projection *f*' of roll 11'. By this arrangement the projections of roll 10' and the projections 36 of roll 11' receive the adhesive as the sheet 12' and 13' travel to the combining nip (FIG. 9). Much less adhesive is required while yet permitting the attainment of well adhered plies. The adhesive pattern as applied to the upper sheet 12' is illustrated at 40 (FIG. 12) and that retained by the middle ply upon separation is indicated at 40'. Similarly, the adhesive zone applied to the lower ply 13' is indicated at 41 and that retained by the middle ply on separation is illustrated at 41'.

FIG. 13 schematically sets forth the adhesive arrangement for a ply of the structure of FIG. 12 and, as is clearly shown, each outer sheet has adhesive on it to the extent of about only 4 – 5% of its surface area.

Figure 14:
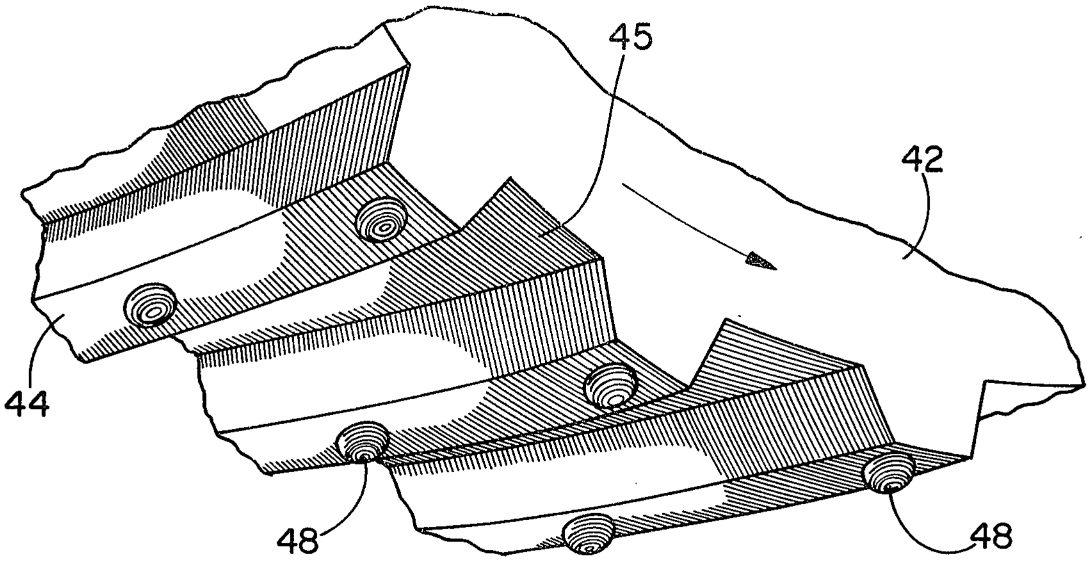
FIGS. 14 and 15 are fragmentary views of a further embodiment of the invention illustrating cooperating upper and lower combining rolls having a different form of mating segments.
Figure 15:
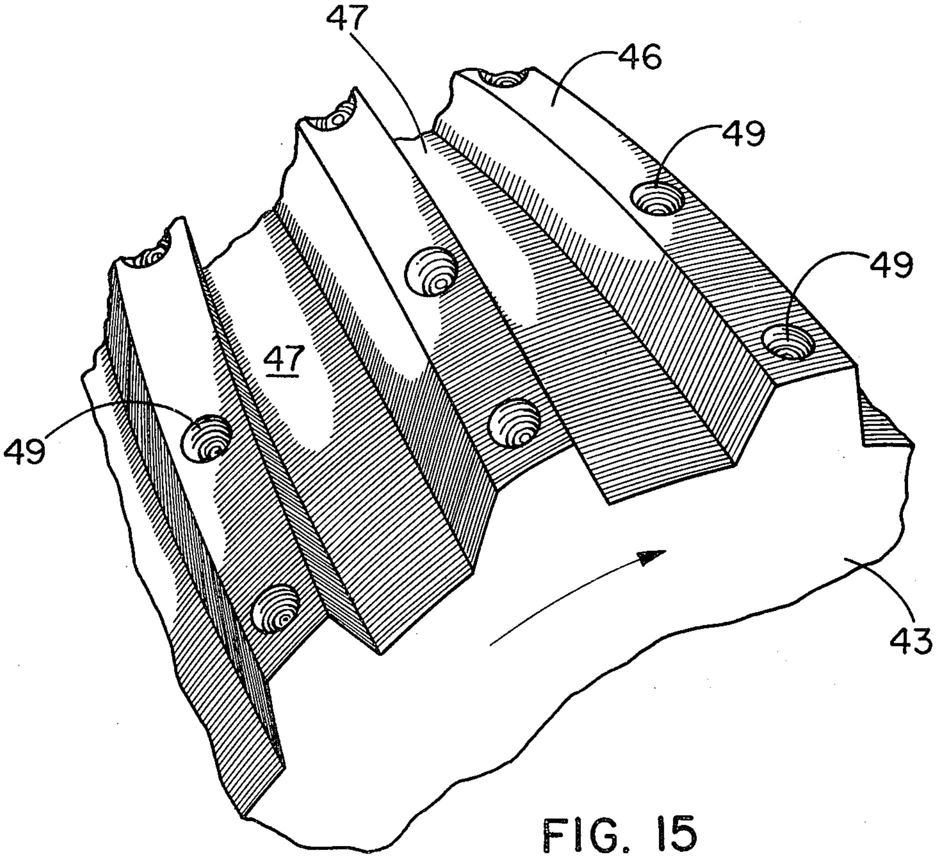
Figure 16:
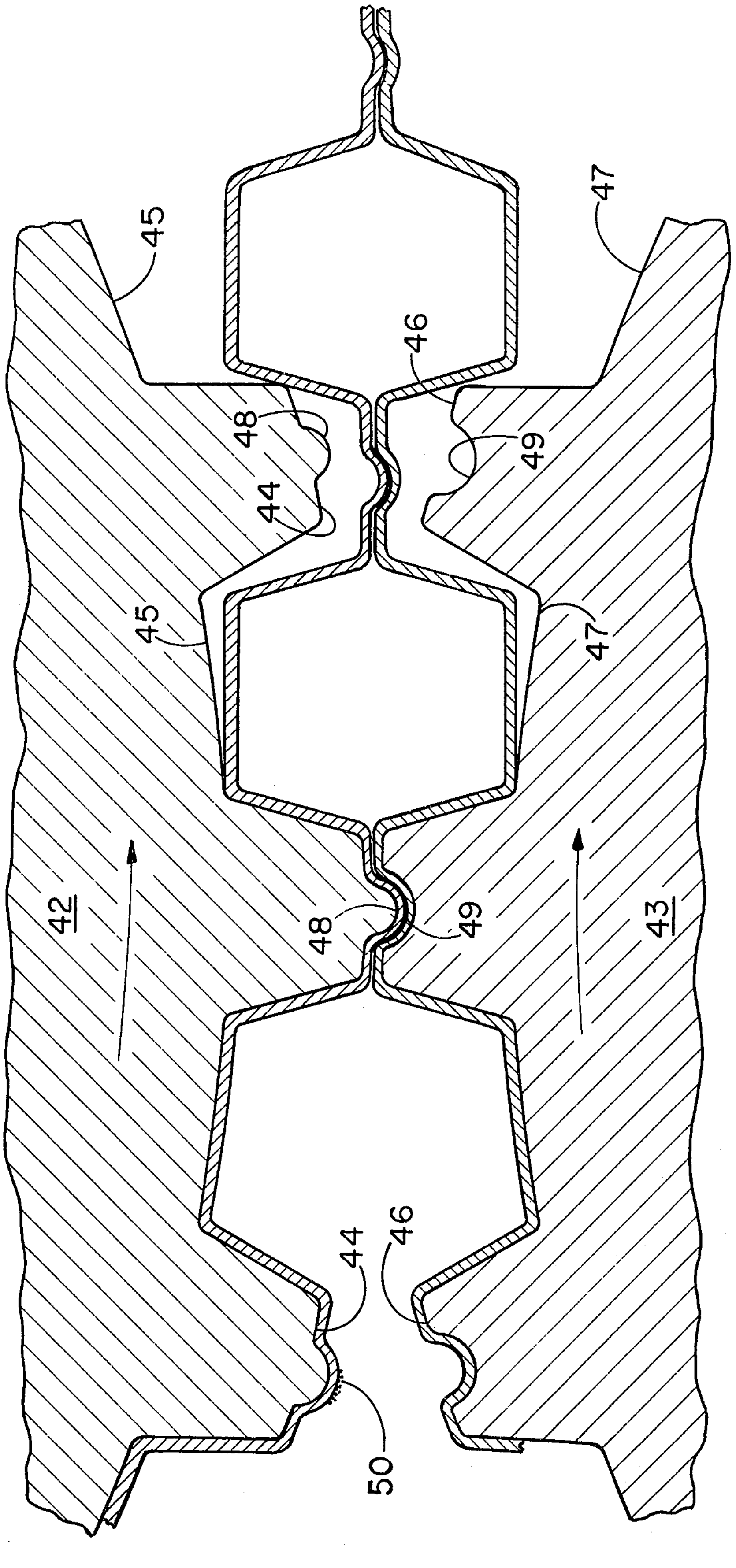
FIG. 16 is a fragmentary view in section of a product passing through the type of combining rolls illustrated in FIGS. 14 and 15.

A further embodiment of the invention is illustrated by the FIGS. 14 through 16 inclusive. The numeral 42 (FIG. 14) designates an upper combining roll of a pair, the lower roll being indicated by the numeral 43. The upper roll has a series of ribs 44 separated by grooves 45 while the lower roll has a series of ribs 46 separated by groves 47. Projections 48, generally conical in shape, well spaced along the length of the ribs 44, mate with generally conical depressions 49 spaced along the length of the ribs 46. As will be obvious from the foregoing, the function of the projections 48 in the furnishing of a two-ply sheet is to support the upper web as it receives the adhesive in the forming of the two-ply structure in the same manner as has been described in connection with FIGS. 1 through 7. However, in this instance the individual adhesive zones may be small in diameter though preferably the recesses or depressions 49 should be maintained shallow to avoid web distortion in the adhesive areas.

Very pertinent to the practice of this invention is the saving in adhesive which makes for an economical product. Further, the fact that much of the area of the sheets does not require adhesive provides for minimal stiffness of the product. Additionally, the adhesive zones may be spaced well apart on any given land area of the product.

EXAMPLE 1

A toweling material was produced by directing base webs to the equipment arrangement of FIG. 1. Such webs suitably have a dryer basis weight of about 9–12 pounds per 2880 square feet and a stretch at break in the range of 20–35%. The adhesive supplied to the upper web was polyvinyl alcohol. Other adhesives may, of course, be employed. The spiral pattern of the rolls had lands about 0.030 inch wide and extended continuously at a 45° angle with respect to the axis of the roll. The depth of the ribs and the distance between ribs was about 0.070 inch. Engraving the lands into recesses and projections reduced the land area of the sheet containing adhesive from 30 to 9%. This reduces the amount of adhesive applied by a factor of over 3 to 1. Resulting laminated product produced by this method had good bulk characteristics, embossing pattern definition and acceptable ply attachment for towel use. Ply attachment values of 10 gms. per 4 inches and up were possible, depending on the amount of adhesive applied and the combining nip pressure between the two engraved steel embossing rolls. Ply attachment was determined by cutting a 4 inch wide sample by about a 6-inch length, separating the two outer webs on a portion of the sample, and then placing those 4-inch wide separated web portions in an Instron tester to measure the force required for ply separation.

EXAMPLE 2

Two and three-ply towel weight samples were prepared using the above spiral rib embossing pattern, prior to and after engraving the cross-over points. For the two-ply samples and the outer surface plies of the three-ply samples, a creped tissue web having a dryer basis weight of 10–11 pounds per 2880 square feet and a stretch at break of about 32% was employed. For the center web in the three-ply samples, a creped tissue web having a dryer basis weight of about 6–7 pounds per 2880 square feet and a stretch at break of about 100%. The following shows test results on these samples.

| | Straight Rib | | Engraved Cross-over Points | |
|---|---|---|---|---|
| | 2 ply | 3 ply | 2 ply | 3 ply |
| Finished Basis Weight - (lbs/2880 sq. ft.) | 26.7 | 41.8 | 23.8 | 38.8 |
| Dry Tensile Strength - (gms./3") MD | 4417 | 4860 | 3500 | 4117 |
| CD | 1491 | 2958 | 1950 | 2533 |
| % MD Stretch | 10 | 16 | 19 | 18 |
| Handle-O-Meter - MD | 10.1 | 19.1 | 6.3 | 11.5 |
| CD | 14.9 | 20.5 | 10.4 | 17.6 |

The Handle-O-Meter values show the improved limpness for the samples produced when the cross-over points were engraved, which is the result of reducing the adhesive coverage on a large portion of the continuous spiral rib lands.

The Handle-O-Meter values were obtained by using a common Thwing-Albert Handle-O-Meter test. For test purposes to obtain the Handle-O-Meter value in the machine direction, 2½ inch wide × 6 inch long samples were used, and for cross direction samples were 2½ inches wide × 3½ inches long. The Handle-O-Meter values give an indication of sheet stiffness and lower values indicate better handle and less stiffness.

In most instances the application of adhesive to the extent of about 5% of the sheet area is suitable if the projections of the roll which receive the adhesive are well and uniformly spaced. The pattern and base tissue weight chosen for the final product influence the amount of adhesive applied to the sheet. With heavier weight sheets and more gross patterns usually a greater amount of area of the sheet is occupied by adhesive to insure of good laminate characteristics. The situations found particularly useful are those in which 10 to 50% of the rib surface area is constituted by projections for receipt of adhesive.

For a three ply sheet where the projections and recesses alternate on one land of each roll, the same principles are applicable but 5% to 25% of the rib surface area will be projections but, of course, adhesive is then applied to both outer sheets.

As many apparently widely different embodiments of this invention may be made without departing from the spirit and scope thereof, it is to be understood that I do not limit myself to the specific embodiments thereof except as defined in the appended claims.

I claim:

1. A multi-ply absorbent paper sheet comprising embossed, opposed, creped outer webs each having a series of laterally extending continuous ribs and grooves, said ribs of each web projecting toward and crossing ribs of the other web and each rib bridging grooves of the other web, adhesive securing the ribs of one web to ribs of the other web, said adhesive being disposed in a pattern consisting of individual adhesive zones and constituting about 10% to about 50% of the rib surface area of one of the webs, said ribs and grooves being otherwise substantially free of adhesive and said adhesive zones being defined by slight recesses in the ribs which break up the continuity of the ribs providing a patterned appearance.

2. A multi-ply absorbent paper sheet as claimed in claim 1 in which the adhesive zones are rectangular.

3. A multi-ply absorbent paper sheet as claimed in claim 1 in which the adhesive zones of a rib are separated from each other by a land area greater in length than the adhesive zones.

4. A multi-ply absorbent paper sheet comprising embossed opposed, creped outer webs, each web having a series of laterally extending continuous rib and grooves, said ribs of each web projecting toward and crossing ribs of the other web and each rib bridging grooves of the other web, an absorbent paper ply between the two webs, adhesive together with the central web securing the ribs of one of the webs to the ribs of the other of the webs, said adhesive being carried by each of the outer webs and disposed on the ribs of each web in a pattern consisting of individual adhesive zones and constituting between about 5 to about 25% of the rib surface area, said ribs and grooves being otherwise substantially free of adhesive and said adhesive zones being defined by slight recesses in the ribs which break up the continuity of the ribs providing a patterned appearance.

5. A multi-ply absorbent paper sheet as claimed in claim 4 in which the adhesive zones carried by each of the outer webs are in laterally spaced relation and free of overlapping.

* * * * *